March 2, 1943.  W. W. PATRICK  2,312,582
COMPOSITE METAL
Filed Dec. 23, 1939
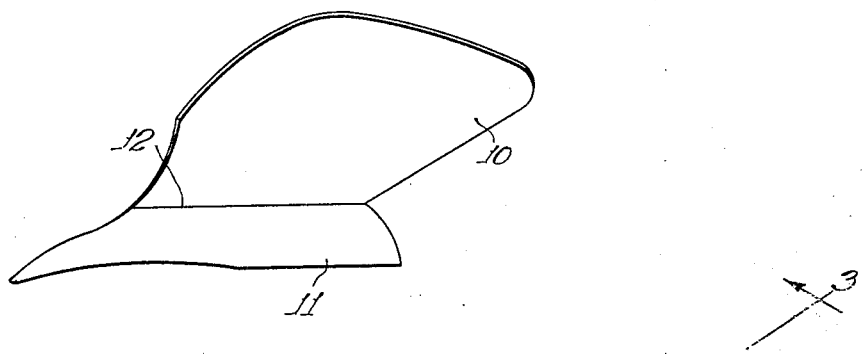
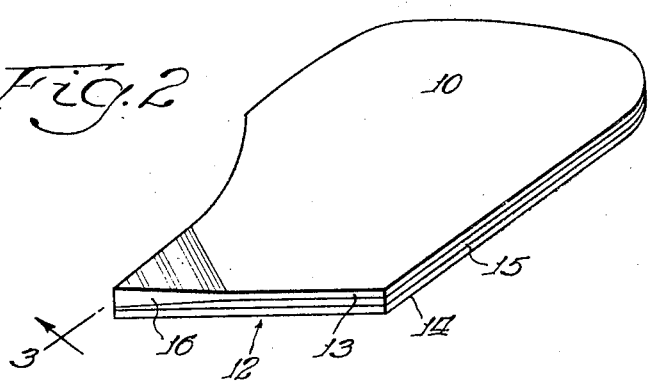
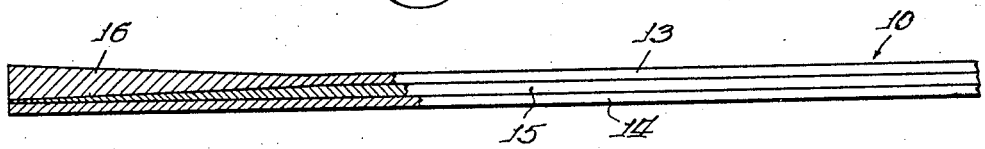
Inventor:
Wilbur W. Patrick
By: Edward C. Gritzbaugh
Atty.

Patented Mar. 2, 1943

2,312,582

UNITED STATES PATENT OFFICE 2,312,582

COMPOSITE METAL

Willbur W. Patrick, New Castle, Ind., assignor to Borg-Warner Corporation, Chicago, Ill., a corporation of Illinois Application December 23, 1939, Serial No. 310,685

2 Claims. (Cl. 29—181)

This invention relates to composite steel plates, and is particularly applicable to composite steel plates which are subjected to mechanical working after heat treatment. For purposes of illustration this invention will be described as applied to composite steel for plows.

Composite steel has been used for a large number of years in the fabrication of mold boards for plows. Such steel is comprised of three substantially equal layers of steel welded together, the center layer being mild steel, and the outer layers being high carbon steel. It has been customary to use from .50 to 2.00% manganese in the outer layers. To the mold board is secured the plowshare, after which the entire plow is ground and polished.

It has been proposed to make composite steel for plows with one high carbon layer thicker than usual to increase the life of the plow. It has also been proposed to make the mold board and shin patch from a single piece of composite steel, the steel in this case being specially cast and rolled so as to possess one thickened side from which the reenforcement previously provided by the shin patch could be formed. In such composite steel the mild steel adjacent the thickened side may be displaced from the center, and considerably reduced in thickness as compared with the thickness of the remainder of the mild steel layer, so as to account for much less than 30% of the total thickness of the composite steel.

It has been noticeable with all users of soft center steel having an uneven distribution of layers that there is an excessive production of defective boards due to checking. This checking is present to a greater or lesser extent in all soft center steel, particularly in mold board stock where a shin is welded on.

It is well known that soft center mold boards and plowshares are subjected to an enormous amount of abuse from a metallurgical standpoint. The steel is quenched glass-hard and then, without any drawing or tempering operation, it is put under strain in fitting to the frog of a plow, in grinding the edges so that the mold board and share fit tightly together, and in polishing the surface so that the soil will not cling to it. All of these operations as carried out in the normal plow shop are generally ruinous to high grade tool steel. Soft center steel withstands these operations more or less satisfactorily because of the center layer of tough steel which acts as a cushion to absorb the strains produced in fitting and polishing.

The thicker the layer of high carbon steel on the surface the more likely is the surface to check and crack. With off-centered, drop-center steel, or steels in which the high carbon layers are not of equal thickness, there is not only the increased hazard due to greater thickness of high carbon steel, but additional strains are induced by the unequal contraction and expansion of the different layers.

It is the object of this invention to provide a composite steel wherein the high carbon layer is thicker than the low carbon layer, but which nevertheless will withstand working subsequent to heat treatment, without excessive checking or cracking.

A typical example of the type of steel to which this invention is applicable is shown in the accompanying drawing which forms a part of this specification, and wherein:

Fig. 1 is an elevation of a plow made from three ply steel;

Fig. 2 is a perspective of the mold board of the plow of Fig. 1; and

Fig. 3 is an enlarged partial cross-section of the mold board shown in Fig. 2, taken along the line 3—3.

It will be observed from Fig. 1 that the mold board 10 must be fitted to the plowshare 11 along a line 12 with a very close fit. This necessitates one of the working operations mentioned above. When the mold board 10 and plowshare 11 have been properly fitted, the assembly must be ground and polished over the entire surface so that the soil will scour properly.

In the example shown, the mold board is made from three ply steel having outer layers 13 and 14 of high carbon steel between which is inserted a layer 15 of mild steel. These layers are of the same thickness throughout the central and back portions of the mold board, but at the leading edge 16 layer 13 is thickened as shown and the mild steel layer 15 is tapered.

The method by which the thickened portion 16 is formed is not a part of this invention, but is disclosed in my copending application Serial No. 250,948, issued August 5, 1941, as Patent No. 2,251,341.

I have discovered that the checking and cracking of the thickened portion 16 can be greatly reduced, if not eliminated entirely, by altering the composition of the outer layer. For many years the standard analysis for the high carbon layer of soft center steel for mold boards has been .95 to 1.15% carbon and .45 to .65% manganese. This analysis has been very satisfactory when applied to the standard soft center steel having two outer layers of high carbon steel and a center layer of low carbon steel, each layer being approximately one-third the total thickness of the plate. When the proportions are altered, however, so that one of the high carbon layers predominates and the center layer is less than one-third of the total thickness of the composite steel, the shock absorbing influence of the center layer becomes insufficient, and cracking and checking result.

I have found that this checking and cracking can be eliminated by the use of a high carbon steel having an analysis of 1.15% carbon and .15 to .40% manganese. In this analysis the manganese content is reduced below the figure usually considered necessary for this purpose. By reducing the manganese content of the outer layer the entire composite steel may be worked as before without any undue checking or cracking. The effect of the lowered manganese content is to make up for the deficiency in shock absorbing qualities of the high carbon steel and to cause the plow to have the same general characteristic that it had before.

For best results, I have found that a manganese content of not more than .40% and not less than .25% is preferred, although the reduction in checking and cracking is still evident when the manganese content is reduced to .15%.

A three ply steel having a high carbon analysis such as that given above can be ground and polished according to the usual procedure with a remarkable reduction in rejects, which of course, effects a greater economy in the manufacture of the plows. It has been found that the plows themselves stand up better under average use, and are therefore more satisfactory to the farmer.

It is understood that the foregoing description is merely illustrative of a preferred embodiment of this invention, and that the scope of the invention, therefore, is not to be limited thereto, but is to be determined by the appended claims.

I claim:

1. A composite three-ply steel having a center layer of mild steel and outer layers of high carbon steel, said layers being of unequal thickness at one region thereof with one of the high carbon layers predominating and the mild steel layer being less than ⅓ the total thickness of the three ply steel at said one region, said high carbon layer having a carbon content of between .70 and 1.30 per cent. and a manganese content of between .15 and .40 per cent.

2. A composite steel plate or bar, including a piece of mild steel and a piece of high carbon steel welded face to face, the mild steel being thinner than the high carbon steel, and the high carbon steel having a carbon content of between 0.70 and 1.30 percent and a manganese content of between 0.15 and 0.40 percent.

WILLBUR W. PATRICK.